Aug. 4, 1931. W. ARTER ET AL 1,816,888
MAGNETIC CHUCK AND CIRCUITS THEREFOR
Filed June 28, 1929 3 Sheets-Sheet 1

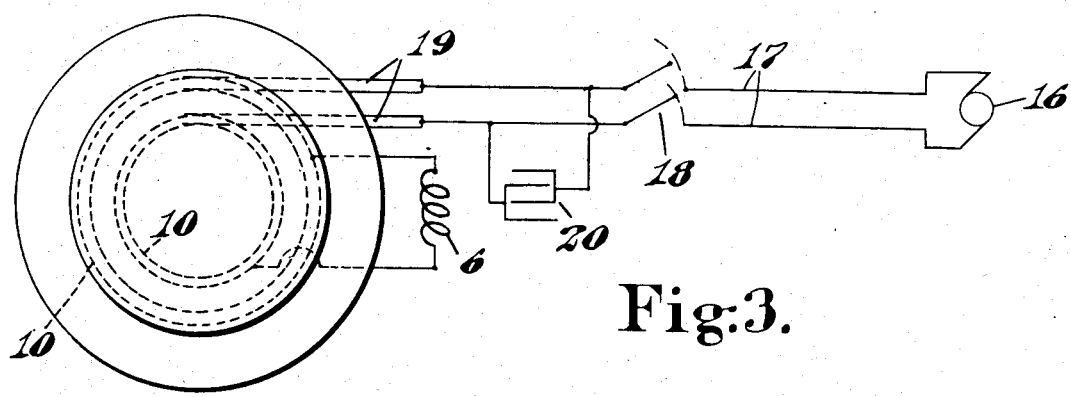
Fig:3.
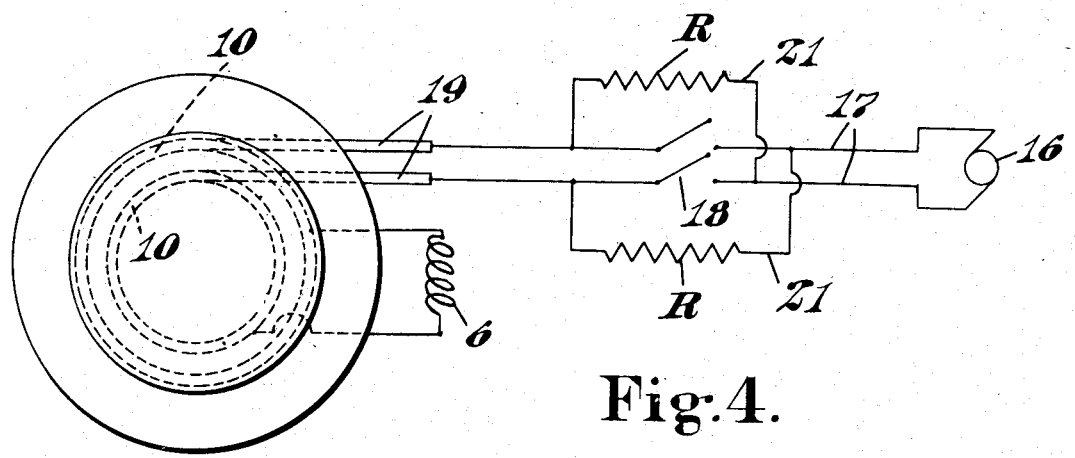
Fig:4.

Aug. 4, 1931.  W. ARTER ET AL  1,816,888
MAGNETIC CHUCK AND CIRCUITS THEREFOR
Filed June 28, 1929   3 Sheets-Sheet 3

INVENTORS
William Arter, Harry Arter,
and Samuel T. Webster,
BY J. H. McCready,
Their ATTORNEY.

Patented Aug. 4, 1931

1,816,888

UNITED STATES PATENT OFFICE

WILLIAM ARTER, HARRY ARTER AND SAMUEL T. WEBSTER, OF WORCESTER, MASSACHUSETTS, ASSIGNORS TO ARTER GRINDING MACHINE COMPANY, OF WORCESTER, MASSACHUSETTS, A CORPORATION OF MASSACHUSETTS

MAGNETIC CHUCK AND CIRCUITS THEREFOR

Application filed June 28, 1929. Serial No. 374,521.

This invention relates to magnetic chucks and to circuits for such chucks.

Chucks of this type are much used in machine tools having automatic mechanism for placing the pieces of work in the machine and removing them therefrom and in which, consequently, it is necessary to de-magnetize the chuck at frequent intervals. Under these circumstances it is desirable not only to demagnetize the chuck during the placing of the work on it and the removal of the work therefrom, but also to neutralize the residual magnetism. This is desirable both because it makes the work handling operations easier and also for the reason that it reduces the wear on the work supporting face of the chuck. It is of further advantage in facilitating the removal of the chips or fine metal particles from the chuck and demagnetizing the pieces of work. While the operation of neutralizing the residual magnetism in a chuck by manual control is not an especially difficult matter where the factor of time is not important, it is difficult to perform this operation satisfactorily by automatic control and in the time interval permissible in an automatic machine working on a high production schedule. So far as we are aware, no entirely satisfactory way of accomplishing this result has been devised.

The present invention deals especially with this problem and aims to devise a thoroughly satisfactory solution for it. The invention involves both a novel chuck construction and also novel circuit arrangements.

The nature of the invention will be readily understood from the following description when read in connection with the accompanying drawings, and the novel features will be particularly pointed out in the appended claims.

In the drawings,

Figs. 3, 4 and 5 are diagrammatic views showing different circuit arrangements for the chuck;

Figure 1:
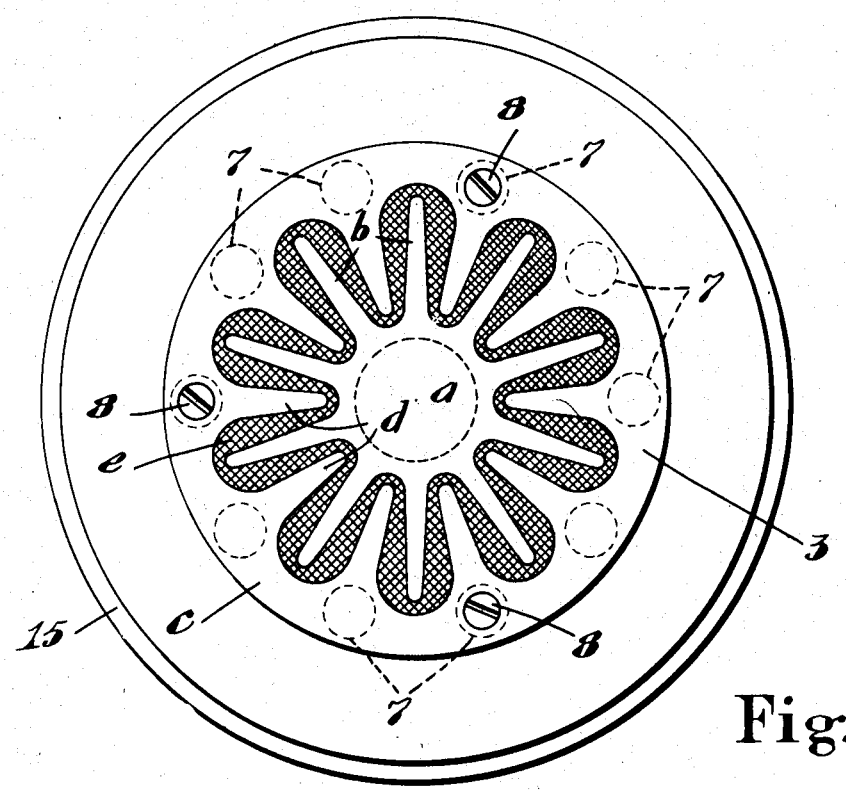
Figure 1 is a plan view of a chuck embodying features of this invention.
Figure 2:
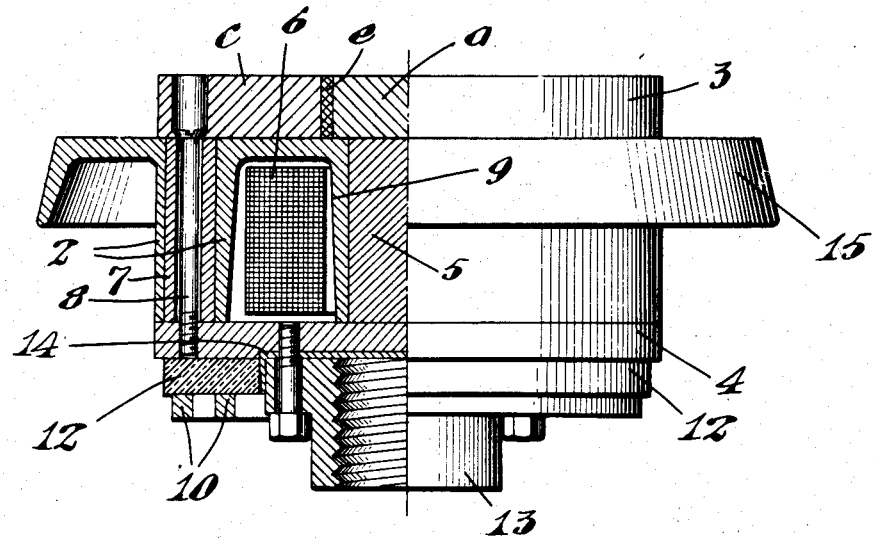
Fig. 2 is a side elevation, partly in vertical section, of the chuck shown in Fig. 1.

Referring first to Figs. 1 and 2, the chuck construction there shown comprises a body member 2 made of non-magnetic metal with top and bottom plates 3 and 4 secured to its upper and lower ends. A core 5 extends centrally through the body member 2 and magnetically connects the top and bottom plates. A magnetizing coil 6 encircles the core 9 and is housed in a cavity formed in the body member. The top or work supporting plate 3 consists of a central member or section $a$ resting directly on the core 5 and having a series of arms $b$ radiating therefrom; an outer section $c$ which encircles the inner section $a$ and has inwardly extending arms $d$ lying between the arms $b$, and non-magnetic metal $e$ which separates the parts $a$ and $c$ made of magnetic material and provides a non-magnetic gap in the top plate. The magnetic circuit through the core and top and bottom plates is completed through a series of posts 7 of magnetic metal which connect the outer section $c$ on the top plate 3 with the bottom plate or base 4 made of magnetic material. These posts extend vertically through holes formed in the body member 2 and they are spaced from and are independent of each other and preferably are located substantially on the center lines of the arms $d$. Certain of these posts are made hollow or tubular to receive screws 8 which secure the top and bottom plates 3 and 4 to the opposite ends of the body member 2 and core 5.

In assembling the parts of the chuck care is taken to make tight joints between the body member 2 and the plates 3 and 4 so that the liquids used in wet grinding cannot work into the interior of the chuck and come in contact with the coil.

In order to conduct current to the coil the two leads from it are led, respectively, to slip rings 10—10 both of which are supported on an insulating ring 12 bolted to the lower or base plate 4. Usually the chuck is mounted on the upper end of a rotary shaft, and for this reason the chuck customarily has an internally screw threaded fitting, 13, secured centrally to the bottom thereof, this fitting being magnetically separated from the chuck base by a plate 14 of brass or other non-magnetic material. The body 2 is provided with a relatively wide peripheral flange 15 to assist it in shedding the water or other liquid used in wet grinding.

In using this chuck the slip rings 10—10 are connected to a source of direct current supply in the usual manner, and the flow of current through the magnetizing coil 6 sets up a field of force or magnetic flux through the core, top plate 3, posts 7, and bottom or base plate 4. Pieces of work made of iron, steel, or other magnetic metal, especially those of circular form, such as piston rings, are held securely on the top plate 3 in the usual manner.

It should be noted that the magnetic gap in the top plate is made rather wider than is usual since this construction has the effect of reducing the magnetic leakage and creating a relatively stronger concentration of the lines of force in the work. It also reduces the effect of residual magnetism. The use of a relatively small number of separated connecting members, such as the posts 7, in one part of the magnetic circuit reduces the residual magnetism, because a smaller amount of magnetic metal is present in the magnetic circuit. A further advantage of this construction is that it reduces the manufacturing cost, both because of the nature of the operations performed and also because it permits the making of the posts of soft Swedish iron which has proved particularly suitable for magnetic chucks. It is difficult to obtain this material in large pieces, but it is readily obtainable in small rods.

In using this chuck in a grinding machine or other machine tool, it is connected in a direct current circuit in the manner indicated diagrammatically in Fig. 3. Referring to this figure it will be seen that a direct current generator, or other source of current supply, is shown at 16 and is connected through conductors 17—17 and a switch 18 to the brushes 19—19 which bear on the slip rings 10—10. The magnetizing coil 6 is connected across these rings.

As above stated, it is desirable in using the chuck in a grinding or similar machine not only to de-magnetize the chuck between successive operations on the work, but also to substantialy neutralize the residual magnetism and to accomplish both of these results in a fraction of a second. One arrangement for accomplishing this object is shown in Fig. 3. It includes a condenser 20 connected across the magnetizing circuit at a point behind the switch 18. When the switch is opened the magnetic field set up by the coil 6 collapses, thus creating an inductive "kick" or back e. m. f. which charges the condenser 20. Due to the fact, however, that the condenser is connected to the coil behind the switch so that the opening of the switch does not disconnect it from the coil, it immediately discharges through the coil 6 in a direction opposite to that of the flow of the magnetizing current. By selecting a condenser of a capacity suited to the size and design of the chuck, this condenser current may be made of such a value as to substantially neutralize the residual magnetism without building up a reverse or opposed magnetic field. In other words, this current may be made just enough to buck down the residual magnetic field and kill it.

We have found that for a chuck in which the magnetizing coil has 2200 ampere turns and is designed to operate on 110 volts, a condenser having a capacity of 22 microfarads produces very satisfactory results. Obviously, however, the condenser capacity required will depend upon the design of the particular installation with which it is to be used.

This arrangement has the advantage of being extremely simple, entirely automatic, and requiring no switching other than the ordinary switch for controlling the flow of magnetizing current to the coil.

A somewhat different arrangement is illustrated in Fig. 4 where the coil 6 is connected to the generator 16 through conductors 17 and a switch 18, as in the circuit above described. Here, however, the switch 18 is bridged by cross connections 21—21 from the supply terminals or conductors to the leads or brushes connected with the slip rings, and a relatively high resistance R is included in each of these connections. In this arrangement, therefore, the opening of the switch 18 still leaves the magnetizing coil 6 connected with the source of current supply through the resistances R—R. A weak "coercive" current, therefore, is allowed to flow through the coil 6 even when the switch 18 is open, and the amperage of this current is so cut down by the resistances R—R that it serves to buck down or substantially neutralize the residual magnetism but is not sufficient to set up a reverse magnetism of any material value.

Figure 5:
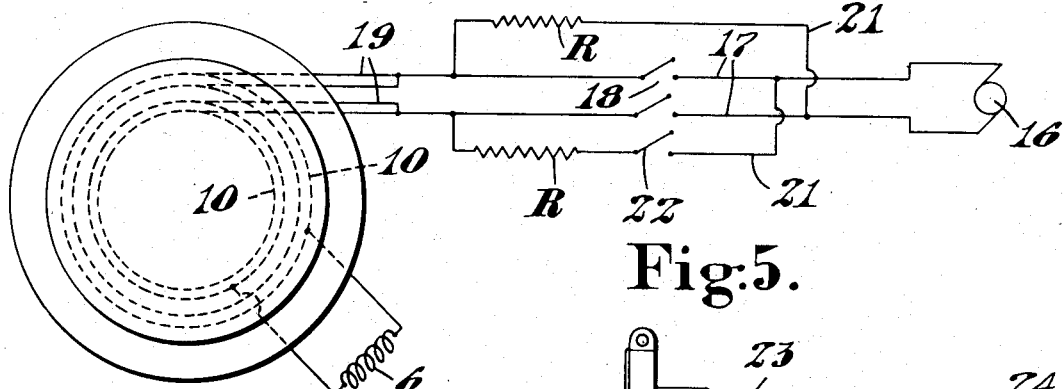

The arrangement just described necessarily involves a somewhat longer time factor than is desirable in some machines, and a variation of this arrangement is shown in Fig. 5 which permits the use of a somewhat stronger coercive or neutralizing current. The circuit illustrated in Fig. 5 is like that shown in Fig. 4 except that a switch 22 is included in one of the cross connections bridging the switch 18. This switch 22 is intended to be opened a fraction of a second after the opening of the switch 18 so that the coercive or neutralizing current will be cut off when it has been allowed to flow through the coil 6 for a sufficient length of time to neutralize the residual magnetism.

Figure 9:
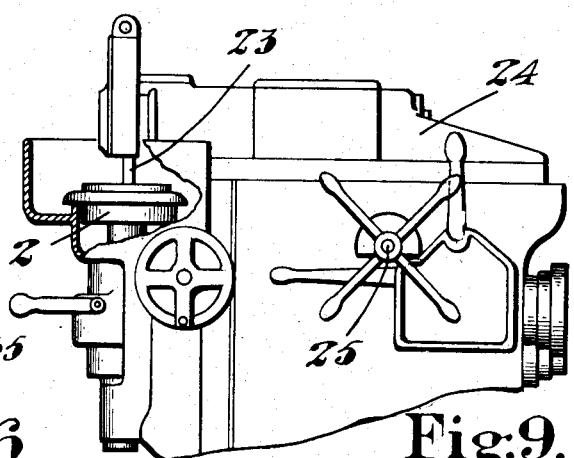
Fig. 9 is a side view of part of a grinding machine to which the invention may conveniently be applied.

A mechanism for automatically operating the switches 18 and 22 in the manner above described is illustrated in Figs. 6 to 9 which show the invention applied to a grinding machine of the construction disclosed in the Arter Patent No. 1,579,056, granted March 30, 1926. Referring to Fig. 9 it will be seen that the magnetic chuck is shown at 2 and the grinding wheel at 23, this wheel being mounted on a reciprocating carriage 24 which moves backward and forward to traverse the grinding wheel across the desired portion of the face of the chuck. A shaft 25 is positively connected with the mechanism for reciprocating the slide 24, the arrangement being such that the shaft oscillates, rotating in time with the movement of the carriage and reversing simultaneously with the reversal of the carriage. For a more detailed description of the construction and operation of this machine reference should be made to the patent above designated.

Figure 6:
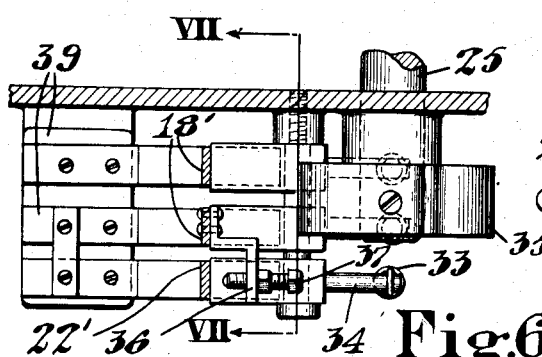
Fig. 6 is a plan view of an automatic switch which forms one feature of the invention.
Figure 8:
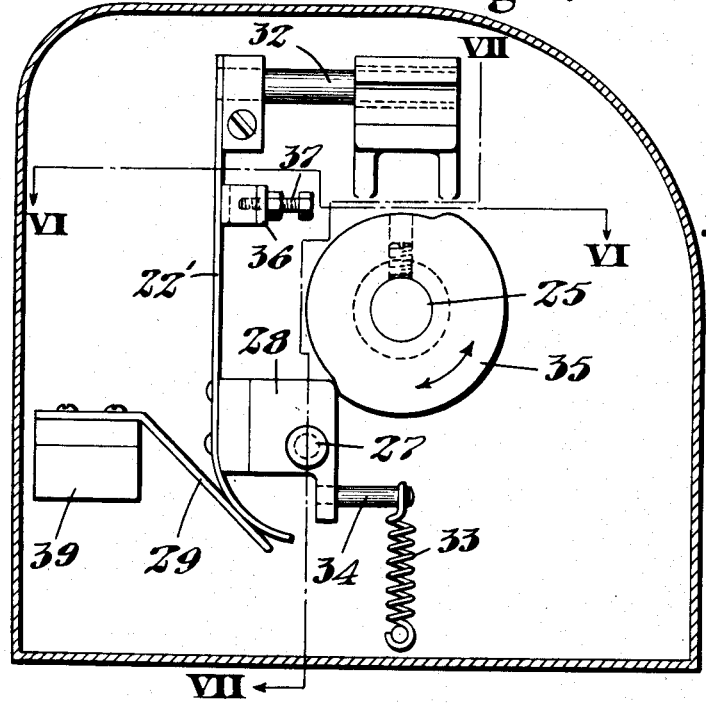
Fig. 8 is a front view of the switch shown in Figs. 6 and 7.
Figure 7:
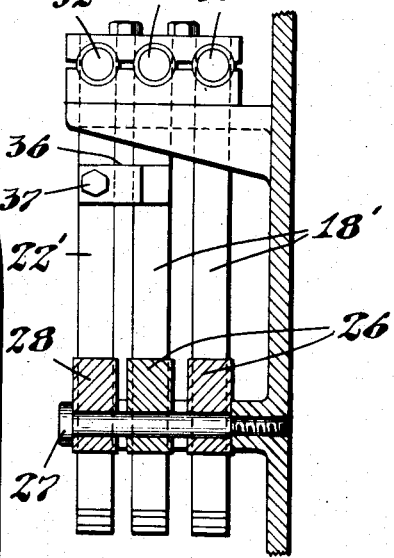
Fig. 7 is a sectional view substantially on the line 7—7, Fig. 6.

In the arrangement shown in Figs. 6, 7 and 8, the shaft 25 is utilized to operate the switches 18 and 22. The first of these switches includes two metal arms 18'—18' carried, respectively, by cam blocks 26—26 but insulated from them. These cam blocks are supported on a stub shaft or pivot 27. The switch 22 includes an arm 22' carried by a similar block 28 which also is mounted on the stub shaft 27. All three of these members 18'—22' have portions curved about the axis of the shaft 27 and bearing against stationary contact strips 29, Fig. 8. These strips are carried by an insulating block 39, and the leads from the source of current supply are led to and connected with the respective strips 29, this arrangement being such that each of the switch arms 18'—22' is constantly in electrical engagement with its respective contact strip 29. At their upper ends these switch arms carry movable contacts to engage, respectively, with stationary contacts 30, 31 and 32. The contacts 30 and 31, respectively, are connected to the brushes 19—19, while the contact 32 is connected to one of the resistances R—R.

Normally the cooperating individuals of each pair of contacts are held in engagement with each other by springs connected with the respective switch arms. In Fig. 8 the spring 33 is shown connected to a pin 34 projecting from the block 28 which carries the switch arm 22'. Essentially the same construction is used with each of the other switch arms. The two blocks 26—26 are arranged to be rocked against the action of their springs 33 by engagement with the cam 35 secured fast on the shaft 25 so that both pairs of contacts of the switch 18 are opened and closed automatically at the desired points in the operation of the machine. In this particular machine the cam 35 usually is so set that it opens the switch 18 while the carriage 24 is moving backwardly and holds it open until the carriage reaches a certain predetermined point in its forward stroke, when it closes the switch again to magnetize the chuck.

The block 28 on which the switch arm 22' is mounted is not engaged by the cam 35 but is operated through a connection with one of the switch arms 18'. This connection consists of a small bracket 36 riveted to one of the switch arms 18' and having a part lying behind the arm 22'. Through this part an adjusting screw 37 is threaded in position to bear against the arm 22'. The arrangement is such that when the switch arms 18' are moved by the cam 25 to open the magnetizing circuit, the switch 22, Fig. 5, will still remain closed so that a reverse current of small amperage will flow through the magnetizing coil 6. A fraction of a second later as the rise of the cam 35 moves past the blocks 26—26 the screw 37 strikes the arm 22' and opens the switch 22. This cuts off the coercive or neutralizing current.

The invention thus provides both a novel design of magnetic chuck and also novel arrangements for substantially neutralizing the residual magnetism of the chuck by means operative automatically and in a definite time relationship to events in the cycle of operations of a grinding or other machine. Because of the nature of this construction it requires practically no attention when once adjusted and is not liable to get out of order.

While we have herein shown and described typical embodiments of our invention, it will be understood that the invention may be embodied in other forms without departing from the spirit or scope thereof.

Claims on the method disclosed in this application and certain features of the apparatus have been divided out of the present case and are presented in our pending application Serial No. 523,742, filed March 19, 1931.

Having thus described our invention, what we desire to claim as new is:

1. In a magnetic chuck, the combination of top and bottom plates of magnetic material, a core, a coil encircling said core, and a series of members of magnetic metal spaced around said coil and connecting said top and bottom plates in the magnetic circuit with said core.

2. In a magnetic chuck, the combination of a body member of non-magnetic material, a core, a coil encircling said core, a top plate of magnetic metal having a non-magnetic gap therein, and means for connecting said top plate and core in the magnetic circuit, including a series of members of magnetic metal supported in said body member and spaced from each other.

3. In a magnetic chuck, the combination of a body member of non-magnetic material, a core, a coil encircling said core, a top plate of magnetic metal having a non-magnetic gap therein, a base, and a series of members of magnetic metal mounted in said body member and connecting said base and top plate together.

4. In a magnetic chuck, the combination of a body member of non-magnetic material, a magnetic core in said member, top and bottom plates bearing against opposite ends of said body member, said plates being of magnetic metal and said top plate including a non-magnetic gap, a coil encircling said core, and a series of posts of magnetic metal set into said body member and magnetically connecting said top and bottom plates together.

5. In a magnetic chuck, the combination of a body member of non-magnetic material, a core in said member, top and bottom plates bearing against opposite ends of said body member, and making tight joints with said member, said top plate comprising a central part having arms radiating therefrom, an outer part encircling said central part and having inwardly extending arms lying between the arms of the central part and non-magnetic metal separating said parts, and a series of posts of magnetic metal connecting said top and bottom plates and spaced between the center lines of the arms of said central top plate part.

6. In a magnetic chuck, the combination of a circular body member of non-magnetic material having a peripheral flange, top and bottom plates of magnetic metal secured to the upper and lower ends, respectively, of said body member and making tight joints therewith, a core connecting said top and bottom plates, a coil encircling said core, said top plate having a non-magnetic gap therein, a series of posts of magnetic metal connecting the marginal portions of said top and bottom plates together, and means for securing all of said parts together.

7. The combination of a magnetic chuck having a magnetizing coil, supply conductors, a switch controlling the flow of magnetizing current from said conductors through said coil, cross connections bridging said switch and connecting said conductors to the coil in a reverse relationship, and a high resistance in one of said connections, whereby a weak coercive current will flow through said connections and coil when the switch is opened.

8. The combination of a magnetic chuck having a magnetizing coil, supply conductors, a switch controlling the flow of magnetizing current from said conductors through said coil, circuit connections for conducting a weaker coercive current through said coil to neutralize the residual magnetism, a second switch for opening and closing said circuit through which the coercive current flows, and mechanism for operating said second switch in a definite time relationship to the opening of the first switch.

In testimony whereof we have hereunto signed our names to this specification.

WILLIAM ARTER.
HARRY ARTER.
SAMUEL T. WEBSTER.